US005186080A

United States Patent [19]

Simon, Jr. et al.

[11] Patent Number: 5,186,080

[45] Date of Patent: Feb. 16, 1993

[54] ENGINE COASTDOWN CONTROL SYSTEM

[75] Inventors: Robert C. Simon, Jr., Novi; George C. Mitchell, Ypsilanti; Joseph M. Tolkacz, Warren; William G. Polom, Mt. Clemens; Peter M. Medich, Birmingham, all of Mich.

[73] Assignee: General Motors Corporation, Detroit, Mich.

[21] Appl. No.: 831,144

[22] Filed: Feb. 7, 1992

[51] Int. Cl.[5] ........................ B60K 41/04; B60K 41/06

[52] U.S. Cl. ........................................ 74/857; 74/843; 74/856; 74/859; 74/860; 123/325

[58] Field of Search ................. 74/856, 859, 860, 843, 74/857; 123/320, 323, 325, 326, 330, 396

[56] References Cited

U.S. PATENT DOCUMENTS

| | | | |
|---|---|---|---|
| 4,291,656 | 9/1981 | Miyagi et al. | 123/320 |
| 4,474,153 | 10/1984 | Hanamoto et al. | 74/860 X |
| 4,491,115 | 1/1985 | Otobe et al. | 123/325 X |
| 4,515,124 | 5/1985 | Hayashi | 74/859 X |
| 4,596,164 | 6/1986 | Hasegawa et al. | 74/859 X |
| 4,713,763 | 12/1987 | Hofmann | 74/859 X |
| 4,848,189 | 7/1989 | Simon, Jr. et al. | 74/872 |
| 4,941,441 | 7/1990 | Watanabe | 123/325 |
| 4,944,358 | 7/1990 | Wazaki et al. | 123/325 X |
| 4,989,563 | 2/1991 | Fukutomi et al. | 74/860 X |
| 5,060,611 | 10/1991 | Krampe et al. | 123/320 |
| 5,085,301 | 2/1992 | Imamura et al. | 192/0.076 |
| 5,086,667 | 2/1992 | Katayama et al. | 74/860 |

FOREIGN PATENT DOCUMENTS

| | | | |
|---|---|---|---|
| 0341818 | 11/1989 | European Pat. Off. | 74/843 |
| 352051 | 1/1990 | European Pat. Off. | 74/856 |
| 391387 | 10/1990 | European Pat. Off. | 74/856 |

*Primary Examiner*—Leslie A. Braun
*Assistant Examiner*—David E. Henn
*Attorney, Agent, or Firm*—Howard N. Conkey

[57] ABSTRACT

When the throttle of a vehicle engine is released by the vehicle operator of a vehicle having an automatic transmission, the slip of the automatic transmission is measured and the airflow of the engine is trimmed as a function of the measured slip to establish a desired drive-on feel of the vehicle during coastdown.

7 Claims, 5 Drawing Sheets

ENGINE COASTDOWN CONTROL SYSTEM

BACKGROUND OF THE INVENTION

This invention relates to coastdown control for a vehicle engine and, more specifically, to coastdown control having controlled "drive-on" feel of the vehicle.

It is well known in automotive engine controls to regulate the released (typically referred to as closed) position of the throttle in the throttle bore of the engine such as by controlling the position of a movable throttle stop in order to achieve a desired engine operating condition. The most common function of such regulation is the closed loop control of engine idle speed such as by control of the throttle stop to regulate engine airflow.

The need for a controlled transition to the idle speed control mode when the vehicle operator releases the throttle has long been recognized. For example, to prevent the engine speed from undershooting the idle speed, or to prevent the increase in hydrocarbon emissions resulting from a deficiency of air during the coastdown period, it has been suggested that the released throttle position be established at some controlled transitional throttle angle.

One such known system for accomplishing this transitional control provides for controlling the throttle stop during vehicle coastdown to a predetermined coastdown schedule when the throttle is released and engages the throttle stop. The coastdown throttle angle control is continued until conditions for idle speed control are met at which time the idle speed control operating mode is enabled to control engine idle speed. The angle of the throttle established during the coastdown period is a function of parameters that typically include engine temperature, electrical loading, etc.

During vehicle coastdown, the vehicle ride quality as perceived by the vehicle operator is a function of the "drive-on" feel of the vehicle. Excessive engine braking (the engine being driven by the wheels through the transmission during closed throttle coastdown and therefore retarding vehicle motion) or sail on (excessive engine output resulting in the wheels being driven by the engine during coastdown). Each of these drive-on conditions may result in a perceived poor vehicle ride quality.

SUMMARY OF THE INVENTION

This invention provides for control of the vehicle ride quality during the coastdown mode when the throttle is released by the vehicle operator in a vehicle having an automatic transmission. It is well known that the transmission will experience slip primarily in the torque converter that is a function of parameters including speed, engine output torque and load torque. The slip will be of one sign when the engine is driving the wheels and of the opposite sign when the wheels are driving the engine such as during closed throttle coastdown of the vehicle. This invention recognizes that the transmission slip is a measure of the drive-on feel of the vehicle and provides for measuring the slip of the automatic transmission and controlling the air input of the engine during vehicle coastdown when the throttle is released by the vehicle operator to achieve a scheduled slip value such as zero, thereby establishing a desired drive-on feel for desired ride quality objectives, while at the same time providing for other coastdown control objectives including protection of the catalytic converter in the exhaust system of the engine.

In one aspect of the invention, the transmission slip is monitored and the amount of airflow into the engine is controlled by use of the idle speed control motor to control the throttle blade opening to achieve the desired scheduled transmission slip.

In another aspect of the invention, the control of the engine airflow during coastdown in response to the slip of the automatic transmission is enabled only in the high forward gear ratio to enable the operator to select a lower gear if it is desired to provide engine braking to retard the vehicle.

In yet another aspect of the invention, adjustment to the coastdown airflow as a function of transmission slip is disabled when the fuel supply to the engine is disabled in response to a deceleration fuel shutoff routine during vehicle coastdown.

SUMMARY OF THE DRAWINGS

Referring to FIG. 1, reference numeral 10 generally designates a motor vehicle drive train including an internal combustion engine 12 and an automatic transmission 14. The engine includes a crank shaft whose output drives the transmission 14, the output of which drives the vehicle wheels (not shown). Air is drawn into the engine 12 via a conventional air intake system 16 wherein a throttle in an induction passage controls the flow of air therethrough. Fuel is delivered to the engine via a conventional port fuel injection system that includes fuel injectors (not shown) delivering fuel to the respective cylinders of the engine 12 in accord with a conventional fuel control routine.

Figure 2:
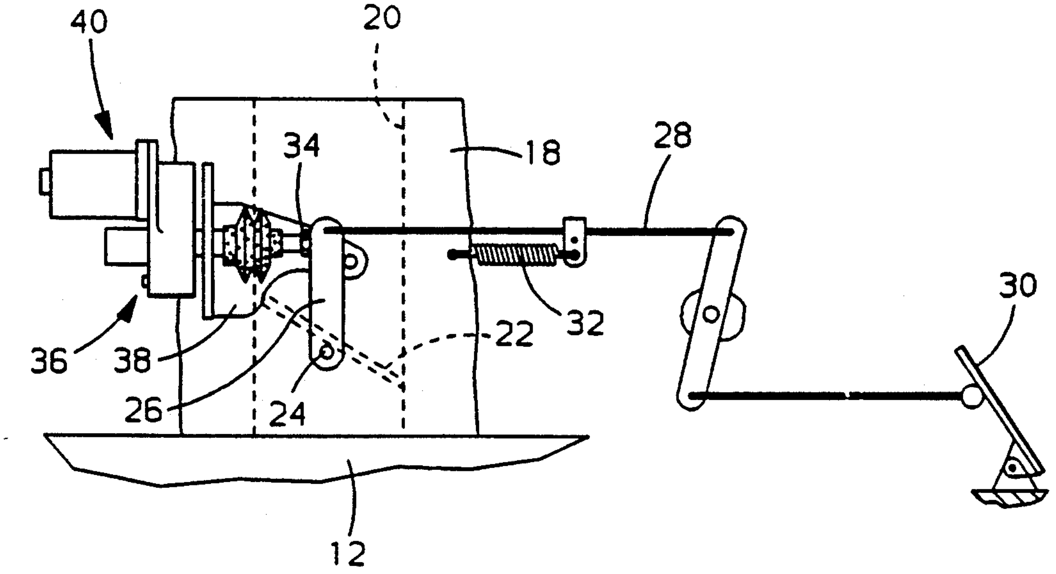
FIG. 2 is an elevational view of a throttle stop control device controlled by the control unit of FIG. 1.

The airflow control apparatus is more specifically illustrated in FIG. 2. As seen in this FIG., the engine 12, of which only a top portion is shown, includes a throttle body 18 with a throttle bore 20 in which a throttle valve 22 is pivotally mounted by a shaft 24. The throttle valve shaft 24 has a lever 26 fixed thereto which is operably connected by linkage 28 to an accelerator pedal 30 located in the vehicle's passenger compartment. The throttle valve 22 is normally opened by the vehicle operator depressing the accelerator pedal 30. When the operator releases control of the throttle valve 22, the throttle lever 26 is returned and held by a return spring 32 against a throttle stop 34 on a throttle stop positioner 36 which is mounted by a bracket 38 on the throttle body 18. The throttle stop positioner 36 is controlled to adjust the position of the throttle stop 34 thereby controlling the minimum open position of the throttle valve 22 and thus airflow into the engine when the operator releases the accelerator pedal 30. As will be described, in addition to the conventional idle speed control of the engine when the throttle is returned against the throttle stop, the throttle stop positioner 36 is also controlled to establish the desired coastdown conditions of the engine 12 when the throttle 22 is released by the vehicle operator.

Figure 1:
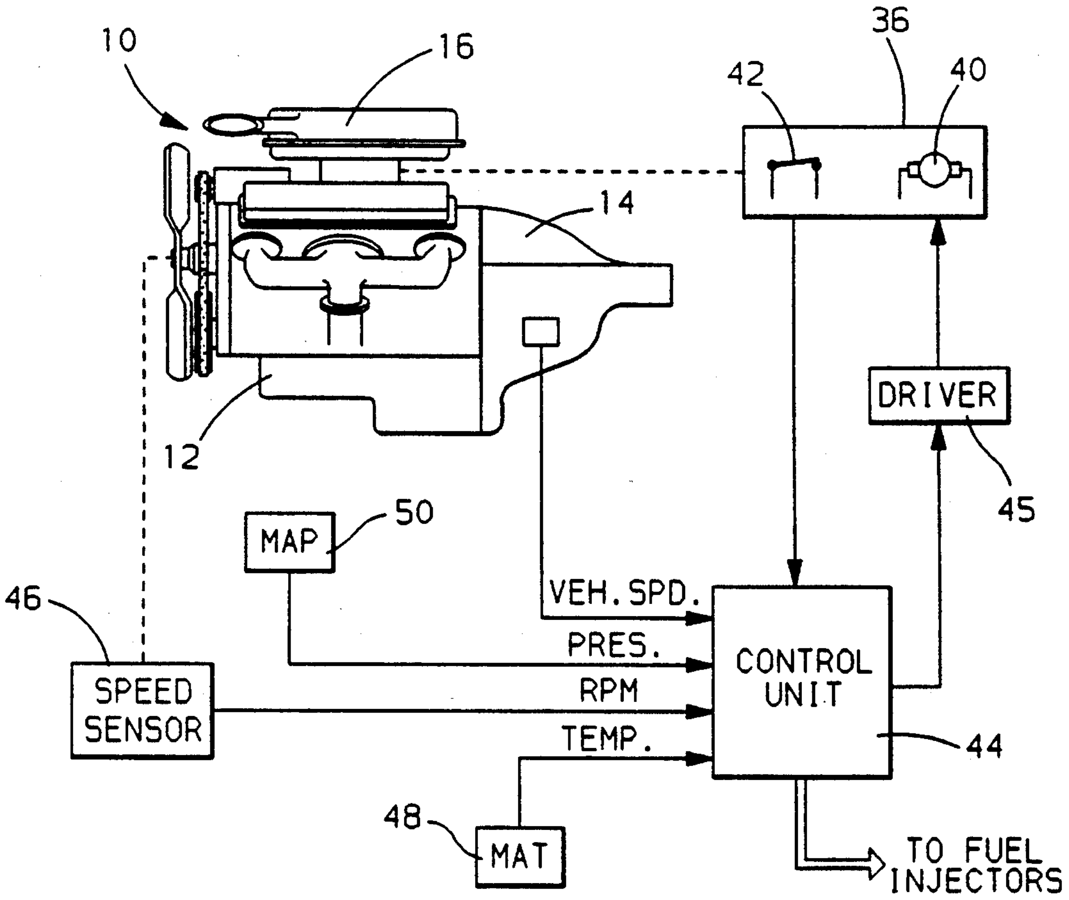
FIG. 1 is a diagram of a motor vehicle engine and a control system including a computer based control unit for carrying out the vehicle engine coastdown control function of this invention.

The throttle stop positioner stop 36 includes a direct current permanent magnet motor 40 whose output shaft is coupled to a gear train such that upon rotation of the motor output shaft, the throttle stop 34 is caused to extend or retract depending upon direction of rotation of the output shaft of the motor 40. By selective operation of the motor 40, the position of the stop 34 is controlled to define the released position of the throttle valve 22 in the throttle bore 20. The throttle stop positioner 36 also includes a throttle stop switch 42 (schematically illustrated in FIG. 1) that is closed by a slight movement of the throttle stop 34 when engaged by the throttle lever 26. The closed switch then indicates a released throttle condition. The specific form of the throttle stop positioner 36 including the switch 42 operated upon release of the throttle valve 22 may take any desired form including by way of example the form as illustrated in the U.S. Pat. No. 4,212,272 which issued on July 15, 1980 and which is assigned to the assignee of this invention.

Returning to FIG. 1, a control unit 44 responds to various input signals and controls the DC motor 40 for establishing the desired engine idle speed and for establishing the transition to the idle speed control mode including the coastdown control mode upon release of the vehicle throttle by the vehicle operator. The motor 40 is controlled by the control unit 44 via a driver circuit 45 to establish the desired position of the throttle stop 34. The driver circuit 45 may take the form of a conventional H-switch that is responsive to a signal representing a commanded direction of the motor 40 and a control signal for driving the motor in the specified direction.

To establish the desired position of the throttle stop 34, input signals indicative of various operating parameters are supplied to the control unit 44. One such signal is a signal representing vehicle speed provided such as by a conventional speed transducer in the transmission 14 monitoring the speed of the output shaft of the transmission 14. Engine speed is provided by a speed sensor 46 which may be any sensor providing a signal indicative of the rotational speed of the crankshaft. The control unit 44 also receives analog signals from a manifold absolute temperature sensor 48 providing a temperature signal indicating the temperature of the air charge drawn into the intake manifold and the analog output of a manifold absolute pressure sensor 50 providing a signal representing the absolute pressure in the intake manifold of the engine 10. Other signals may be provided to the control unit 44 as required for control of fuel injected into the engine and for spark timing. The output of the throttle stop switch 42 in the throttle stop positioner 36 is provided to the control unit 44 to provide a signal indicative of a released or non-released condition of the throttle blade 22.

In its preferred form, the control unit 44 is computer based and takes the form of any well-known digital computer controller typically including a central processing unit, random access memory, read-only memory, input/output circuits, timer circuits, an analog-to-digital converter and a clock. Generally, the central processing unit in the controller executes an operating program permanently stored in its read-only memory which also contains calibration constants and values stored such as in lookup tables addressed in accord with the values of selected parameters. The output of the speed sensor 46, the throttle stop switch 42, and the vehicle speed output of the transmission 14 are supplied to the input/output circuit of the control unit 44. The analog signals from the manifold air temperature transducer 48 and the manifold absolute pressure sensor 50 are processed by the analog-to-digital circuit in the control unit 44.

The input/output circuit of the control unit 44 provides for a discrete output to the motor driver 45 to establish the direction of operation of the DC motor 40 and a pulse output to the motor driver 45 to cause the DC motor 40 to position the throttle stop 34. Similarly, the control unit 44 provides via its input/output circuit pulse signals to fuel injectors for controlling the fuel quantity delivered to the engine 12. The input/output circuit may provide the controlled pulse output to the motor 40 and the fuel injectors such as by initiating the pulse and inserting into a register a number representing a point in time as measured by a free running counter clocked by the internal clock for terminating the pulse. When the free running counter becomes equal to the count in the register, the pulse is terminated.

The digital control unit 44 may execute a plurality of interrupt routines in response to particular interrupt signals. In the control of the throttle stop 32 for coastdown control when the throttle is released by the vehicle operator, two such interrupt routines are executed. One such interrupt is a high frequency interrupt provided at, for example, 12.5 millisecond intervals whereby a 12.5 millisecond interrupt routine as illustrated in FIG. 3 is executed and another interrupt routine is executed at a lower frequency interrupt provided at, for example, 250 millisecond intervals, during which a 250 millisecond interrupt routine as illustrated in FIG. 4 is executed.

Figure 3:
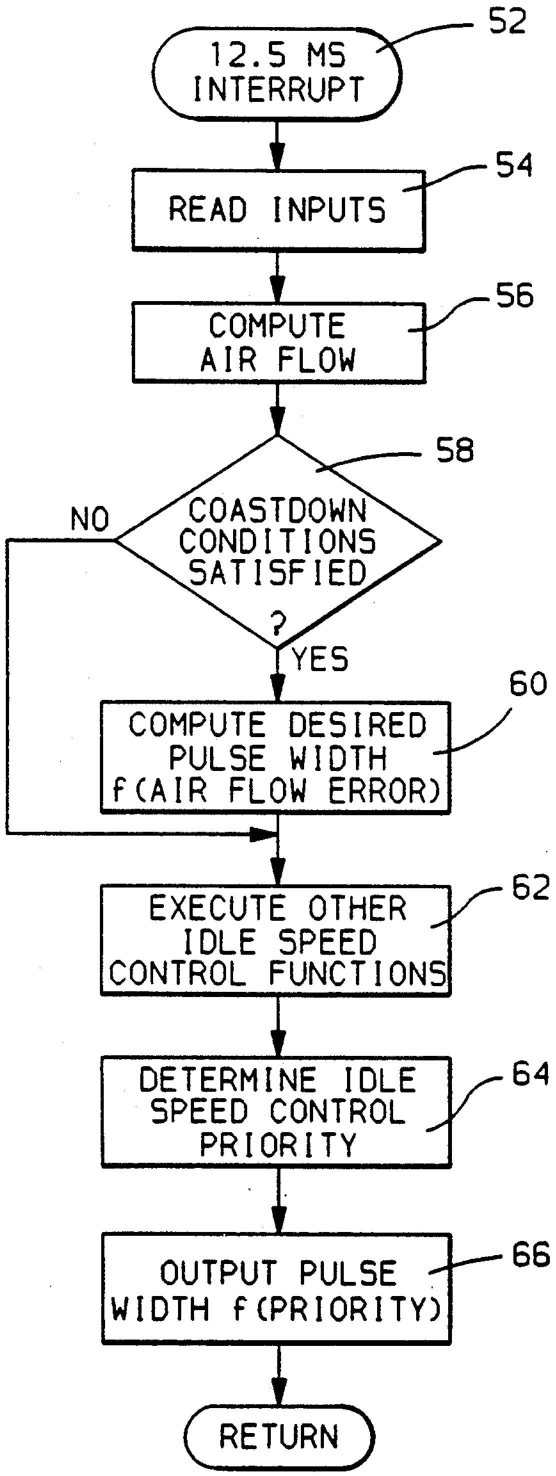
FIGS. 3 through 5 are flow diagrams illustrating operation of the computer based control unit of FIG. 1 in carrying out the coastdown control function of this invention.
Figure 4:
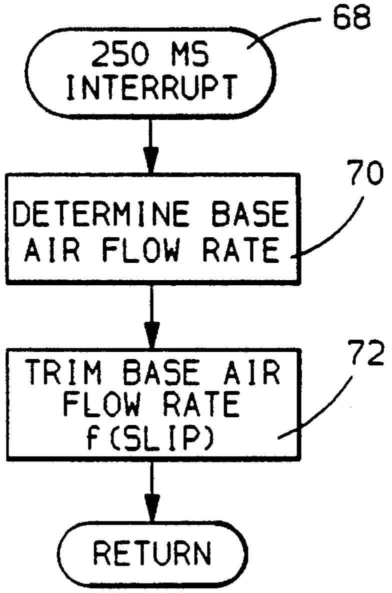

Referring first to FIG. 3, the 12.5 millisecond interrupt routine illustrated provides for control of the DC motor 40 to establish desired coastdown and idle speed control functions. Upon the occurrence of the 12.5 millisecond interrupt, the routine is entered at point 52 and proceeds to a step 54 where the various input signals are read and stored in memory. These input signals include vehicle speed, manifold absolute pressure, engine speed and manifold air temperature. When these inputs have been stored in memory for subsequent recall, the program executes a step 56 where the actual engine airflow rate is computed, based on the measured parameters of engine speed, manifold air temperature and manifold absolute pressure. This computation is conventional and well known in fuel control systems wherein engine airflow is computed based upon engine speed and the density of air in the intake manifold as computed by the various parameters read at step 54.

Next the routine determines if the conditions for coastdown control are satisfied. These conditions may include predetermined vehicle and engine speed conditions. If step 58 determines that the coastdown conditions are satisfied, a step 60 computes the desired pulse width of the signal to be applied to the motor 40 for controlling the position of the throttle stop to establish a coastdown engine airflow. In general, the coastdown control routine monitors the airflow entering the engine and establishes the airflow at a value to assure adequate air for maintaining engine operation, to protect the catalytic converter in the exhaust system and in accord with this invention, to control the automatic transmission slip for control of vehicle drive-on feel. The desired coastdown airflow is determined via the routine of FIG. 4 to be described. The pulse width determined at step 60 is computed as a function of the error in the actual airflow computed at step 56 and the desired coastdown airflow rate. The determination of the pulse width is provided in response to airflow error and may include conventional proportional, integral, and derivative terms wherein the pulse width provides for a desired amount of movement of the throttle to provide for adjustment of the engine airflow in direction to reduce the airflow error to zero. The sign of the error also establishes the direction of control of the motor 40. Accordingly, it can be seen as the airflow error is reduced, the pulse width applied to the motor 40 is decreased and approaches zero as the error approaches zero.

Upon completion of the step 60 or if the coastdown conditions were not satisfied as determined at step 68, a step 62 executes other idle speed control functions that may include the determination of a desired pulse width as a function of idle speed error and a desired pulse width for a throttle follower routine. Thereafter, a step 64 determines, based on a priority schedule, which pulse width should be applied to the motor 40 for control of the throttle stop 34. Based on the control priority determined at step 64, the selected output pulse width along with a forward/reverse direction signal is applied to the motor 40 via the driver 45 to establish the desired airflow rate. Accordingly, when step 64 selects the coastdown control mode, step 66 outputs a motor drive pulse as computed at step 60 to the driver 45 along with a direction signal to drive the motor in direction to establish the desired coastdown airflow. Thereafter, the program exits the routine of FIG. 3.

In summary, the routine of FIG. 3 controls the throttle stop 30 by control of the motor 40 to establish a desired engine airflow rate to achieve desired engine/powertrain objectives, including coastdown control and engine idle speed control.

As indicated, the duration of the control pulse established via step 60 of the routine of FIG. 3 is based upon an airflow error relative to a desired coastdown airflow rate. This rate is determined by the 250 millisecond interrupt routine of FIG. 4. Referring Figure upon occurrence of the 250 second millisecond interrupt, the routine is entered at point 68 and proceeds to a step 70 where a base desired coastdown airflow rate is computed. This airflow rate is determined in accord with standard coastdown dependent parameters including engine coolant, electrical load, air conditioner operation and other conventional parameters. After the base airflow rate is determined, the coastdown airflow rate is then trimmed at step 72 in accordance with this invention as a function of the slip of the automatic transmission 14. In general, the base airflow rate is trimmed based on the measured transmission slip in direction so as to establish a predetermined slip value representing a substantially constant engine braking level during vehicle engine coastdown. In one embodiment, the controlled slip value is zero. However, other target slip values may be selected as required to achieve the coastdown mode objectives.

Figure 5A:
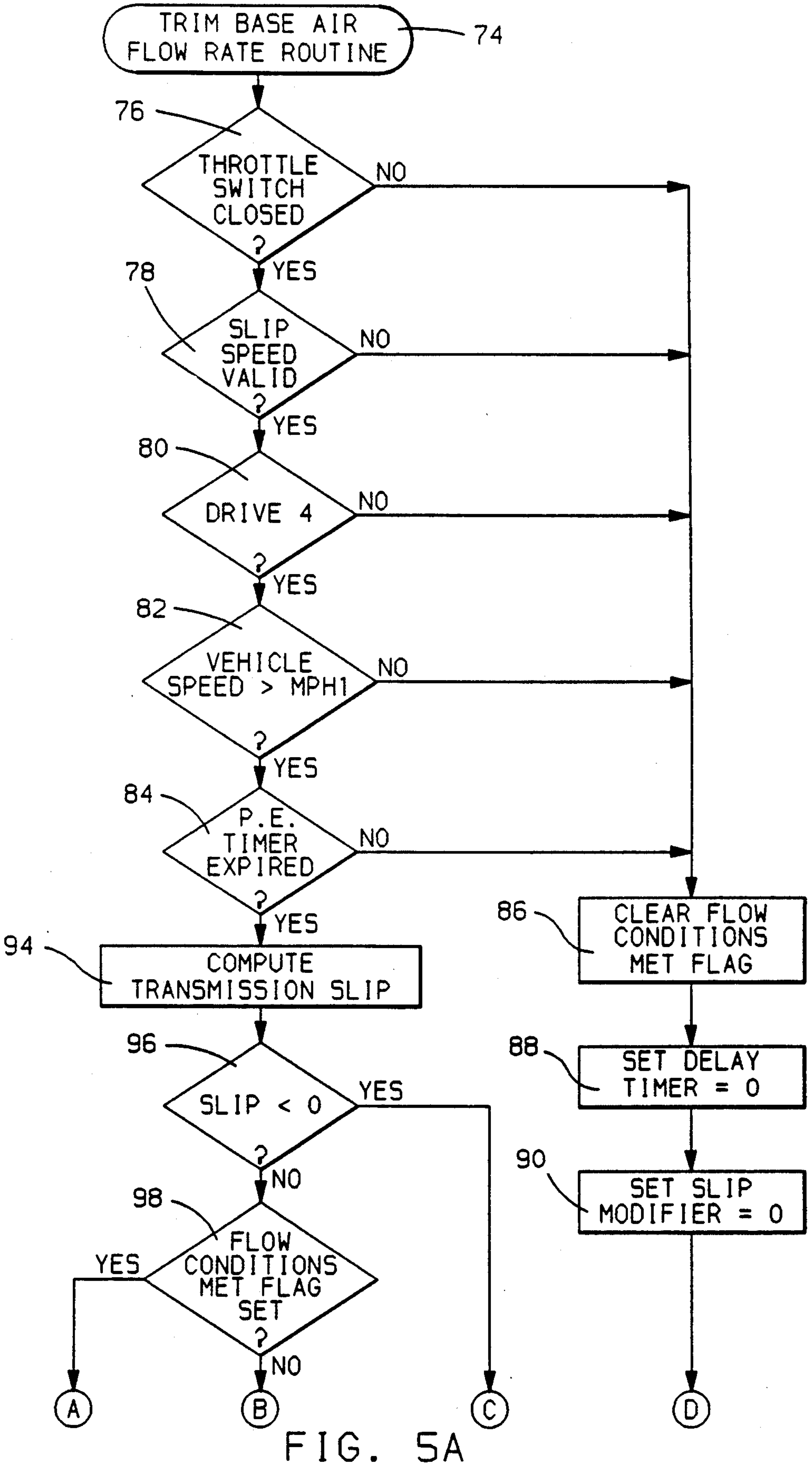
Figure 5B:
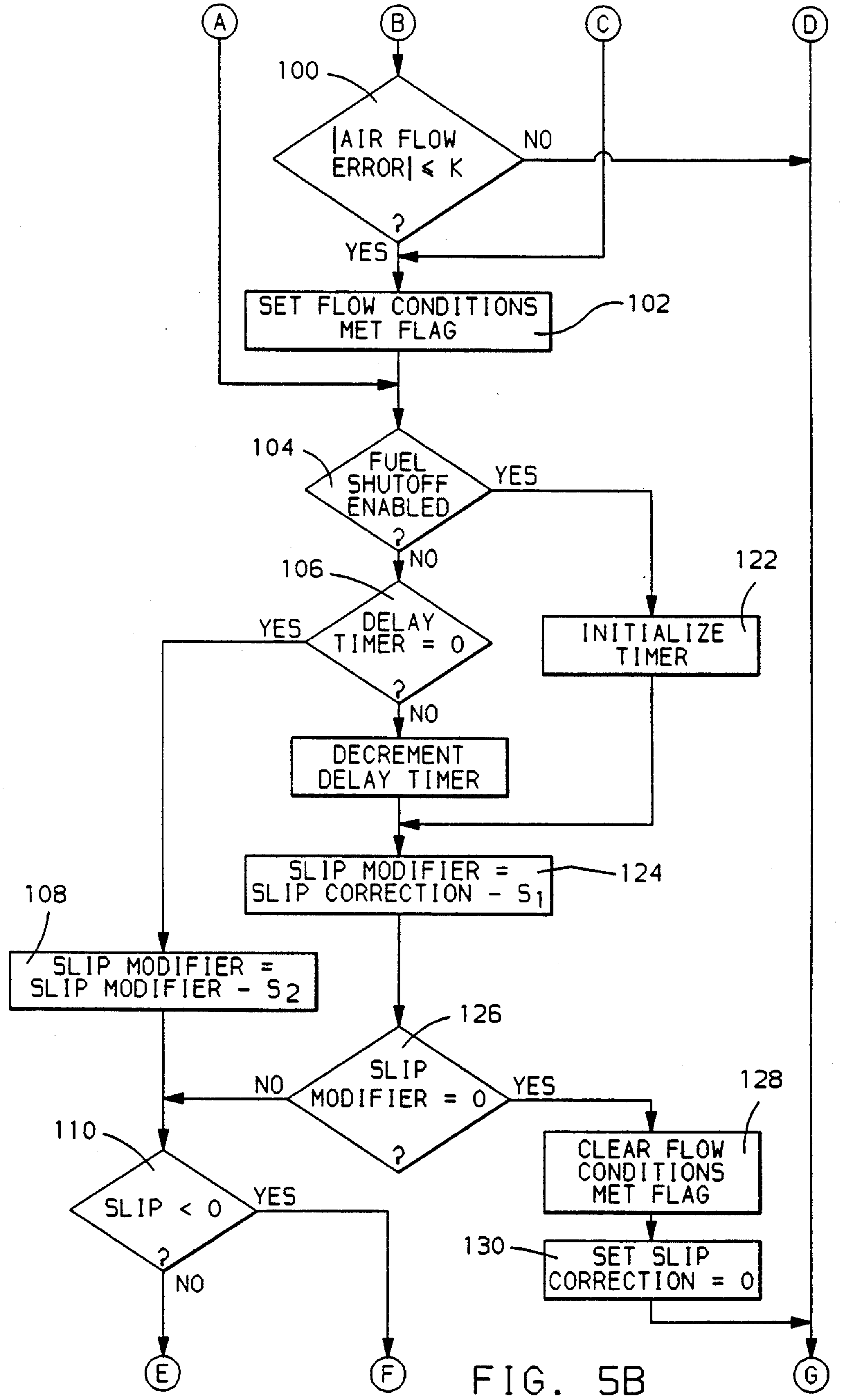
Figure 5C:
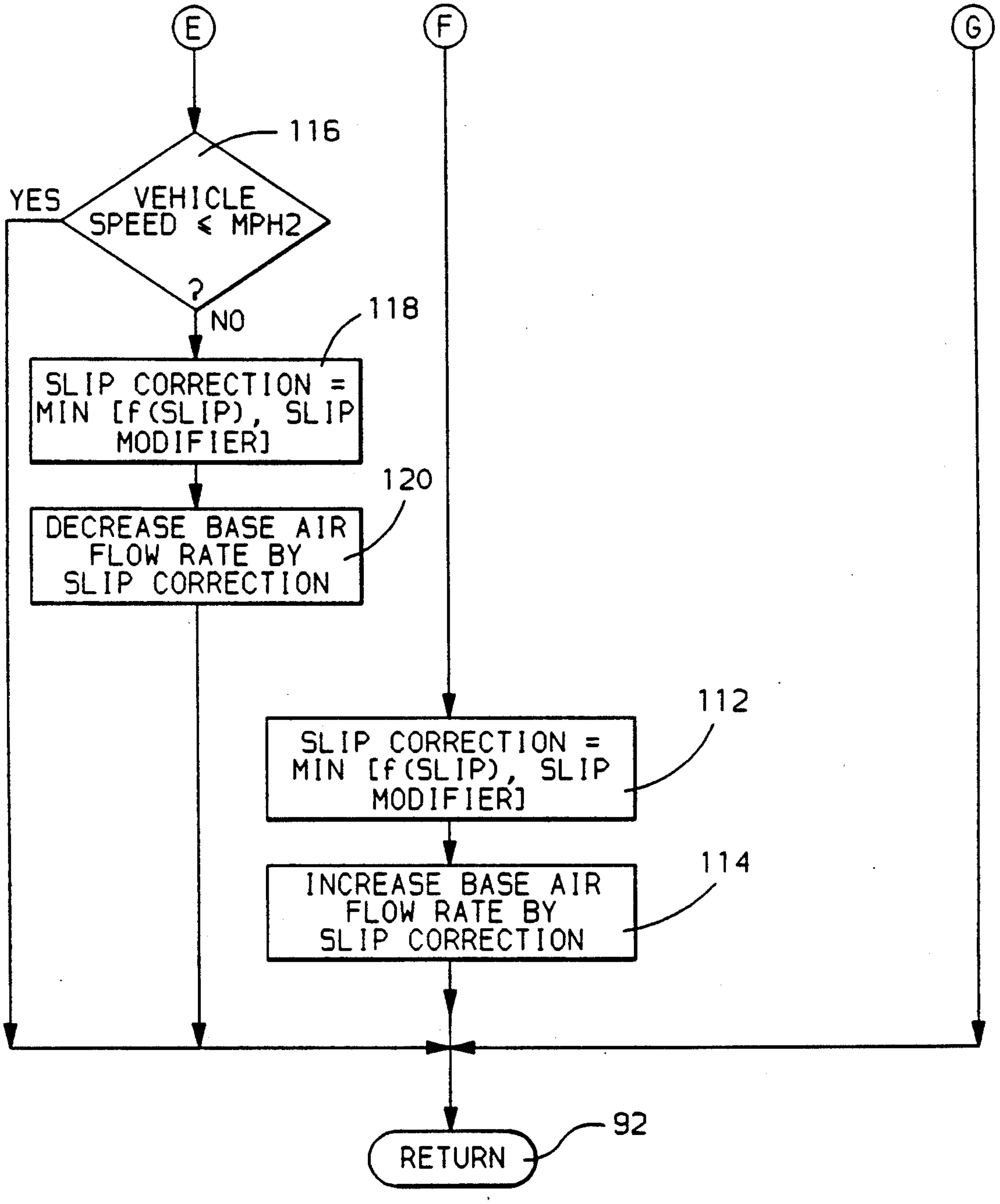

The routine for trimming the base airflow rate as a function of slip is illustrated in FIGS. 5*a* through 5*c*. Referring to these figures, the routine is entered at step 74 and determines via steps 76 through 84 whether or not conditions exist for allowing trimming of the base airflow rate determined at step 70 as a function of transmission slip to achieve a desired slip condition. These conditions are the throttle switch 42 closed indicating the throttle has been released by the vehicle operator (step 76), the slip speed is valid as determined by a diagnostic routine (step 78), the automatic transmission 14 is in the highest drive gear ratio such as drive 4 in a 4-speed transmission (step 80), the vehicle speed is greater than a vehicle speed threshold MPH1 (step 82), and a power enrichment timer has expired indicating that power enrichment has been totally ramped out in a conventional fuel control routine executed by the control unit 44 (step 84). If any one of these conditions are not met, a flow conditions met flag is cleared at step 86, a delay timer is set to zero at step 88 and a slip modifier value is set to zero at step 90. Thereafter, the routine of FIG. 5 returns to the 250 millisecond interrupt routine of FIG. 4 via step 92.

Assuming now that the conditions of steps 76 through 84 are met for trimming the base coastdown airflow value computed at step 70, the base airflow is trimmed according to the following additional conditions. In general, when the transmission slip indicates that the engine is driving the wheels through the transmission 14 (referred to as positive slip), the base airflow rate determined at step 70 is decreased by a calibration slip correction amount determined to decrease the magnitude of the positive slip to substantially zero (1) after the actual airflow is first controlled to within a predetermined value K of the base airflow rate computed at step 70, (2) when the vehicle speed is greater than a threshold speed MPH2 and (3) when the fuel control routine executed by the control unit 44 is not in a deceleration fuel shutoff mode. When the transmission slip indicates that the engine is being driven by the wheels through the transmission 14 during coastdown (referred to as negative slip), the base coastdown airflow rate computed at step 70 is increased by a calibration slip correction amount determined to decrease the magnitude of the negative slip to substantially zero when the fuel control routine executed by the control unit 44 is not operating in the deceleration fuel shutoff mode.

In accord with the foregoing, the routine first computes transmission slip at step 94. In general, the slip of the transmission is represented by the difference in the transmission input shaft speed as represented by the engine speed determined at step 54 and the transmission output speed comprised of the vehicle speed value determined at step 54 taking into consideration the transmission gear ratio between the two speed measuring points. Step 96 then determines whether the slip is negative or positive.

If the transmission slip is not less than zero indicating a positive slip condition, the program proceeds to a step 98 to determine whether the airflow conditions met flag is set. As will be described, this flag is set whenever the coastdown airflow has first been controlled to within the predetermined constant K of the base airflow rate computed at step 70. Assuming first that the flow conditions met flag has not been set, step 100 determines if the airflow error represented by the difference between the desired base airflow rate computed at step 70 and the actual airflow rate computed at step 56 is less than or equal to the constant K. If not, the program returns to the 250 millisecond interrupt routine of FIG. 4 via step 92 without adjusting the base airflow rate computed at step 70. As long as the conditions monitored by steps 76–84 and 96 do not change, the foregoing steps are repeated until step 100 determines that the airflow error has been reduced below the threshold value K by the repeated execution of the routine of FIG. 3 as previously described. When this condition is sensed, the flow conditions met flag is set at step 102 indicating the condition established by step 100 has been met for decreasing the coastdown airflow rate. Returning to step 96, if the slip is determined to be negative, the flow conditions met flag is set at step 102 independent of the magnitude of the airflow error.

As indicated above, in the preferred embodiment the coastdown base airflow rate computed at step 70 is not trimmed as a function of transmission slip if the fuel routine executed by the control unit 44 has shut off the fuel in accord with a conventional deceleration fuel control routine. In general, the magnitude of an airflow correction to the coastdown base airflow value is ramped to zero whenever the fuel routine executed by the control unit 44 has shut off fuel delivery and for a predetermined time period after fuel is again supplied to the engine. After expiration of the time period after termination of the deceleration fuel shutoff, the airflow slip correction is ramped to a value that is a predetermined function of transmission slip.

A fuel shutoff condition is sensed at step 104 if the transmission slip is negative (step 96) or if the airflow error condition of step 100 has been satisfied. Assuming first that step 104 determines the fuel control routine executed by the control unit 44 is not operating in a deceleration fuel shut off mode, the routine determines at step 106 if a delay timer is equal to zero. As will be described, this timer times the period following termination of a deceleration fuel shutoff mode in the fuel control routine. Assuming initially that the timer is at zero, the program proceeds to increase a fuel shutoff slip modifier by a calibration constant S2 at step 108. The slip modifier is limited to a predetermined maximum value. As will be described, this step provides for ramping the airflow slip correction value to a calibration slip dependent correction value following termination of a fuel shutoff fuel control mode. It is assumed first that this slip modifier is at the limited maximum value that is greater than any calibration slip dependent correction value.

The routine next provides for adjustment of the base coastdown airflow as a function of the transmission slip computed at step 94 to establish the desired drive-on performance of the vehicle (represented by zero slip in this embodiment). Accordingly, if the slip is negative as sensed at step 110, the slip correction value previously referred to is set at step 112 to a value equal to the minimum of either a value retrieved from a look-up table as a function of the magnitude of the slip or the fuel shutoff slip modifier established at step 108. Based on the initial condition assumed above wherein the slip modifier is at its maximum value, the step 112 establishes the slip correction at the correction value that is retrieved from the lookup table as a function of the magnitude of transmission slip. Step 114 then increases the coastdown base airflow rate by the amount of the slip correction established at step 112. This increased airflow rate is then established via the routine of FIG. 3 as previously described to thereby adjust the transmission slip toward zero. Via the calibration slip dependent values stored in lookup table, the slip correction generally establishes an adjustment of the coastdown base airflow rate such that the magnitude of the transmission slip is reduced to substantially zero when the routine of FIG. 3 establishes the desired coastdown airflow rate.

As previously described, the adjustment is made to decrease the base coastdown airflow when the slip is positive only when the vehicle speed is greater that a low speed threshold MPH2. Accordingly if the slip is positive as sensed at step 110 and the next step 116 determines the vehicle speed is less than or equal to the threshold MPH2, no adjustment is made to the coastdown base airflow determined at step 70 and the routine returns to the 250 millisecond interrupt routine of FIG. 4. However, if the vehicle speed is greater than the low speed threshold MPH2, a step 118 is executed wherein the slip correction value is set to a value equal to the minimum of either a value retrieved from a lookup table as a function of the magnitude of transmission slip or the fuel shutoff slip modifier. Again assuming that the slip modifier is at its maximum value, the step 118 establishes the slip correction at the correction value that is retrieved from the lookup table as a function of the magnitude of transmission slip. Step 120 then decreases the coastdown base airflow rate by the amount of the slip correction established at step 118. This decreased airflow rate is then established via the routine of FIG. 3 as previously described to adjust the transmission slip toward zero. As with the lookup table used at step 112 for negative transmission slip, the calibration slip dependent values stored in the lookup table for positive transmission slip provide for an adjustment of the coastdown base airflow rate such that the transmission slip is reduced to substantially zero when the routine of FIG. 3 established the desired coastdown airflow rate. Following step 120, the routine returns to the 250 millisecond interrupt routine of FIG. 4 via step 92.

As long as the fuel control routine executed by the control unit 44 does not shut off fuel during coastdown, the foregoing described steps provide for adjustment of the coastdown base airflow rate as a function of the magnitude of the transmission slip to establish the desired drive-on performance of the vehicle.

It is assumed now that the conventional fuel control routine executed by the control unit 44 provides for deceleration fuel shutoff during vehicle coastdown. This condition is sensed at step 104 after which the routine proceeds to step 122 to initialize the delay timer. Thereafter, the fuel shutoff slip modifier is set equal to the last determined slip correction minus a calibration constant $S_1$ at step 124. The resultant is limited to zero at this step. Thereafter step 126 determines if the resultant slip modifier is zero. Assuming it is not, the program executes either the step 118 (assuming the condition of step 116 is met) or step 112 depending upon whether the slip is positive or negative. In either one of these steps, the slip correction is set equal to the minimum of the value retrieved from the respective lookup table or the fuel shutoff slip modifier value as set at step 124. Since the slip modifier was set equal to the prior slip correction minus the amount $S_1$, the minimum value detected at the steps 118 or 112 is generally the slip modifier. Accordingly, the slip correction is readjusted to the value of the slip modifier at those steps followed by the corresponding adjustment to the base airflow rate at either step 114 or 120. During the subsequent repeated executions of the routine of FIG. 5 while the fuel is shut off, the value of the slip correction is repeatedly decreased via step 124 and step 112 or step 118 but limited to zero. When the fuel shutoff is disabled by the fuel control routine executed by the control unit 44, the subsequent executions of the routine continues to repeatedly decrease the value of the slip correction as set forth above for the time delay determined by step 122. This is provided for by step 106 and step 126 which decrements the delay timer after which step 124 is executed as described.

Upon repeated executions of the routine of FIG. 5, the slip correction is continually ramped toward zero thereby decreasing the coastdown airflow rate to the base airflow rate until such time that either the delay timer is decremented to zero as sensed at step 106 or the slip modifier has been reduced to zero resulting in no adjustment to the coastdown base airflow rate. Assuming first that the slip modifier has been reduced to zero as sensed at step 126, the program proceeds to a step 128 where the clear flow conditions met flag previously discussed is cleared and then to step 130 where the slip correction value is reset to zero. Thereafter, the routine returns to the 250 millisecond interrupt routine via step 92. Thereafter during repeated executions of the routine of FIG. 5, the steps 128 and 130 are executed in response to step 126 thereby continually bypassing the slip correction provided by steps 112 through 120 so that the coastdown airflow rate is the computed base airflow rate.

At any time the delay timer has been decremented to zero via step 126, step 106 thereafter proceeds directly to the step 108 previously described wherein the slip modifier is incremented by the amount $S_2$ after which the slip correction is computed via step 112 or 118 as previously described. Until the slip modifier has been ramped via repeated executions of step 108 to a value that exceeds the value retrieved from the lookup table at step 112 or 118, the slip correction to the base airflow established at steps 112, 114 or 118, 120 is continually ramped until the slip correction is again established at the value retrieved from the corresponding slip dependent lookup table.

In summary, the routine of FIG. 5 provides for adjustment of the coastdown base airflow rate as a function of the transmission slip so as to establish the transmission slip at the desired value, such as zero, providing the desired vehicle drive-on feel. The slip dependent adjustment to the base airflow rate is ramped out in response to the fuel being disabled during coastdown and thereafter ramped back in upon termination of fuel shutoff.

The foregoing description of a preferred embodiment for the purpose of explaining the principles of this invention is not to be considered as limiting or restricting the invention since many modifications may be made by the exercise of skill in the art without departing from the scope of the invention.

We claim:

1. A method of controlling the rate of airflow into an engine of a vehicle during vehicle coastdown, the vehicle having wheels driven by the engine through an automatic transmission, the method comprising the steps of:

measuring a slip value of the automatic transmission;
sensing a coastdown condition of the vehicle;
comparing the measured slip value to a reference slip value; and
adjusting the rate of airflow into the engine during the sensed coastdown condition in a direction restoring the slip value of the automatic transmission to the reference slip value.

2. The method of claim 1 further including the steps of measuring an engine output speed and measuring a transmission output speed and wherein the step of measuring the slip value of the automatic transmission includes a step of determining the difference between the engine output speed and the transmission output speed.

3. The method of claim 1 in which the transmission has a plurality of forward gear ratios varying from a low ratio to a high ratio and wherein the method further comprises a step of sensing operation of the transmission in the high gear ratio and the step of adjusting the rate of airflow is performed only when the high gear ratio is selected.

4. A method of controlling the rate of airflow into an engine of a vehicle during vehicle coastdown, the vehicle having wheels driven by the engine through an automatic transmission, the method comprising the steps of:

measuring a slip value of the automatic transmission;
sensing a coastdown condition of the vehicle;
comparing the measured slip value to a reference slip value;
controlling the rate of airflow into the engine to a desired coastdown base airflow rate value that is a function of predetermined engine and vehicle parameters; and
adjusting the controlled rate of airflow into the engine during the sensed coastdown condition in a direction restoring the slip value of the automatic transmission to the reference slip value.

5. A method of controlling the rate of airflow into an engine of a vehicle during vehicle coastdown, the vehicle having wheels driven by the engine through an automatic transmission and the engine having fuel delivery that is disabled in response to predetermined vehicle deceleration conditions, the method comprising the steps of:

measuring a slip value of the automatic transmission;
sensing a coastdown condition of the vehicle;
controlling the rate of airflow into the engine to a desired coastdown base airflow rate value that is a function of predetermined engine and vehicle parameters;
determining an airflow slip correction amount; and
when the fuel delivery is disabled during the sensed coastdown condition, adjusting the controlled rate of airflow into the engine by an amount equal to the airflow slip correction amount and in a direction restoring the slip value to the reference slip value.

6. The method of claim 5 wherein the slip correction amount is a predetermined function of the measured slip value.

7. A system for controlling the rate of airflow into an engine of a vehicle during vehicle coastdown, the vehicle having wheels driven by the engine through an automatic transmission, the system comprising in combination:

an engine speed sensors sensing a speed of rotation of the engine;
a transmission speed sensor sensing a speed of rotation of the transmission output;
means for measuring a slip value of the automatic transmission in accord with the difference of the sensed speeds of rotation of the engine and the transmission output;
means for determining a coastdown condition of the vehicle;
an airflow control valve for controlling a rate of airflow into the engine;
means for comparing the measured slip value to a reference slip value; and
means for controlling the airflow control valve during the determined coastdown condition to adjust the controlled rate of airflow into the engine in a direction restoring the slip value to the reference slip value.

* * * * *